(12) United States Patent
Siemsgluess

(10) Patent No.: US 8,898,290 B2
(45) Date of Patent: Nov. 25, 2014

(54) PERSONALLY IDENTIFIABLE INFORMATION INDEPENDENT UTILIZATION OF ANALYTICS DATA

(75) Inventor: Stephan Siemsgluess, Bellevue, WA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/105,566

(22) Filed: May 11, 2011

(65) Prior Publication Data

US 2012/0290708 A1 Nov. 15, 2012

(51) Int. Cl.
*G06F 15/16* (2006.01)
*G06Q 30/02* (2012.01)

(52) U.S. Cl.
CPC ..................................... *G06Q 30/02* (2013.01)
USPC ........ 709/224; 705/14.53; 705/26.1; 705/7.33

(58) Field of Classification Search
USPC ........ 709/223, 224; 705/14.49, 7.29; 370/200
See application file for complete search history.

(56) References Cited

U.S. PATENT DOCUMENTS

| | | | | |
|---|---|---|---|---|
| 5,223,924 A * | 6/1993 | Strubbe | ............................ | 725/46 |
| 5,710,884 A * | 1/1998 | Dedrick | ........................ | 709/217 |
| 5,724,521 A * | 3/1998 | Dedrick | ........................ | 705/26.1 |
| 5,848,396 A * | 12/1998 | Gerace | .......................... | 705/7.33 |
| 6,182,050 B1 * | 1/2001 | Ballard | ....................... | 705/14.61 |
| 7,424,439 B1 * | 9/2008 | Fayyad et al. | ................ | 705/7.33 |
| 8,112,301 B2 * | 2/2012 | Harvey et al. | ................ | 705/7.29 |
| 8,554,602 B1 * | 10/2013 | Zohar et al. | ................... | 705/7.33 |
| 2002/0035568 A1* | 3/2002 | Benthin et al. | ................ | 707/102 |
| 2002/0073138 A1* | 6/2002 | Gilbert et al. | ................ | 709/201 |
| 2003/0115333 A1 | 6/2003 | Cohen et al. | | |
| 2003/0130982 A1 | 7/2003 | Kasriel et al. | | |
| 2004/0103051 A1* | 5/2004 | Reed et al. | ....................... | 705/36 |
| 2008/0263633 A1* | 10/2008 | Banga et al. | ...................... | 726/3 |
| 2009/0070129 A1* | 3/2009 | Inbar et al. | ......................... | 705/1 |
| 2009/0112701 A1* | 4/2009 | Turpin et al. | .................... | 705/10 |
| 2010/0049847 A1 | 2/2010 | Muret et al. | | |

(Continued)

FOREIGN PATENT DOCUMENTS

KR 2009124488 A 12/2009

OTHER PUBLICATIONS

Survey of Anonymity Techniques for Privacy Preserving—Lou Yongcheng et al. (pdf file included) (http://www.ipcsit.com/vol1/45-S017.pdf).*

(Continued)

*Primary Examiner* — Anthony Mejia
*Assistant Examiner* — Linh T Nguyen
(74) *Attorney, Agent, or Firm* — Fish & Richardson P.C.

(57) ABSTRACT

An analytics system receives segment definitions, each associated with an account identifier. The account identifier identifies an analytics tracking account for a publisher. Each segment definition defines a segment of visitors to a network property and, for each visitor in the first segment, includes a visitor identifier identifying a device used by a visitor to visit the network property and which is issued by the analytics system. The publisher selects the visitor identifiers based on customer identifiers that are issued by the publisher, and neither the customer identifiers, nor any personally identifiable information, is provided to the analytics system. The analytics system determines whether the segment definitions present a personal information exposure risk for one or more of the visitors, and processes the segment definitions only in response to determining that the segment definitions do not present a personal information exposure risk for one or more of the visitors.

23 Claims, 5 Drawing Sheets

(56) References Cited

U.S. PATENT DOCUMENTS

| | | | |
|---|---|---|---|
| 2010/0235241 A1 | 9/2010 | Wang et al. | |
| 2011/0022461 A1* | 1/2011 | Simeonov | 705/14.49 |
| 2011/0029618 A1* | 2/2011 | Lavy et al. | 709/206 |
| 2011/0060905 A1* | 3/2011 | Stack et al. | 713/167 |
| 2011/0099202 A1* | 4/2011 | Dedeoglu et al. | 707/780 |
| 2011/0246267 A1* | 10/2011 | Williams et al. | 705/14.4 |
| 2011/0252150 A1* | 10/2011 | Chandrabasu et al. | 709/228 |
| 2011/0258049 A1* | 10/2011 | Ramer et al. | 705/14.69 |
| 2011/0276917 A1* | 11/2011 | Error | 715/781 |
| 2011/0295988 A1* | 12/2011 | Le Jouan | 709/223 |
| 2012/0042262 A1* | 2/2012 | Priyadarshan et al. | 715/745 |
| 2012/0066064 A1* | 3/2012 | Yoder et al. | 705/14.53 |
| 2012/0066065 A1* | 3/2012 | Switzer | 705/14.53 |
| 2012/0096489 A1* | 4/2012 | Shkedi | 725/34 |
| 2012/0150641 A1* | 6/2012 | Dobbs et al. | 705/14.53 |
| 2012/0215793 A1* | 8/2012 | Arsenault et al. | 707/749 |
| 2012/0265614 A1* | 10/2012 | Douglas et al. | 705/14.54 |

OTHER PUBLICATIONS

Efficient k—Anonymization Using Clustering Techniques—Ji-Won Byun et al. (pdf file included) (https://www.cerias.purdue.edu/assets/pdf/bibtex_archive/bhr2615775031x81.pdf).*

Google Ad Innovations—Campaign Insights. http://www.google.com/ads/innovations/campaigninsights.html. [online] [printed Sep. 8, 2011] 2 pages.

Google Campaign Insights: Better measurement for display advertising—Inside AdWords. http://adwords.blogspot.com/2009/10/campaign-insights-better-measurement.html. [online] [printed Sep. 8, 2011] 3 pages.

Batali, John D. U.S. Appl. No. 12/429,566, filed Apr. 24, 2009. 33 pages.

PCT Notification of Transmittal of the International Search Report and the Written Opinion of the International Searching Authority for PCT/US2012/037258, dated Nov. 23, 2012, 9 pages.

* cited by examiner

PERSONALLY IDENTIFIABLE INFORMATION INDEPENDENT UTILIZATION OF ANALYTICS DATA

This disclosure relates to processing network traffic statistics.

BACKGROUND

A publisher is an entity that owns and/or manages a web site. Using analytical services offered by third parties, the publisher can monitor analytical data related to user visits and links to the web site. Example analytical data includes data related to domains and/or web sites from which visitors arrived and to which the visitors departed; traffic patterns, e.g., navigation clicks of visitors within the publisher's web site; visitor actions, e.g., purchases, filling out of forms, etc., and other actions that a visitor may take in relation to the publisher's web site. The analysis of such analytical data can inform the publisher of how the visitors were referred to the publisher's web site, whether an advertising campaign resulted in the referral, and how the visitors interacted with the publisher's web site. With this understanding, the publisher can implement changes to increase revenue generation and/or improve the visitor experience. For example, a publisher can focus marketing resources on advertising campaigns, review referrals from other web sites, identify other publishers as potential partners for cross-linking, and so on.

One example analytical system that provides analytical tools that facilitate the collection and analysis of such analytical data is provided by Google™ Analytics, available from Google, Inc., in Mountain View, Calif. To use such systems, a publisher typically provides tracking request code embedded in its web pages. Typically the tracking request code is a snippet of JavaScript™ code that the publisher adds onto every page of their web site for which traffic is to be tracked. When the page is requested by a user device, the tracking request code determines if the tracking code is stored in a browser cache on the user device. If the tracking code is not stored in the browser cache, the tracking request code requests and downloads tracking code from an analytics server. The tracking code is then stored in the browser cache on the user device and executed.

The tracking code collects visitor data and sends it back to the analytics server in the form of a tracking data communication for processing. The tracking data communication includes an account identifier that identifies an analytics account of the publisher, a visitor identifier that identifies the visitor (i.e., a computer device that is used by a user to access the particular page of the publisher), and event statistics, such as whether the visitor has been to the web site before, the timestamp of the current visit, referrer data identifying the referrer site, campaign data identifying the advertising campaign the visitor came from, and other event statistics.

The tracking code sets one or more corresponding cookies in the visitor's browser, and the cookies include the visitor identifier. The cookies are used to store information related to the tracking data communications, such as the number of times the visitor has been to the web site, the time of the current visit, referrer data, and campaign data. The cookies that are set by the analytics system do not, however, include personally identifiable information; instead, identifiers are used to identify tracking communications reported from a particular device.

Publishers, on the other hand, may often collect personally identifiable information ("PII") from users. For example, assume a publisher is an on-line retailer, and requires users to establish accounts to purchase products on-line. Each account for each user may store personally identifiable information, such as the user's name, the user's address, the user's gender, an identifier that the publisher issues to uniquely identify the user, etc.

Publishers would like to examine the analytics data for various customer segments to determine behavioral characteristics of customers that belong to each segment. For example, an online retailer may have many customers that frequently purchase goods through its online purchasing service, and may also have many customers that in frequently purchase goods through its online purchasing service, or perhaps never purchase goods through its online purchasing service (e.g., users that establish an account but then never purchase goods). Likewise, the publisher may have many visitors to its website that never establish an account.

However, processing analytics data by customer segments may expose additional personally identifiable information to the publisher. Likewise, providing personally identifiable information to the analytics system may expose the analytics system to personally identifiable information that it does not collect.

SUMMARY

In general, one aspect of the subject matter described in this specification can be embodied in methods that include the actions of receiving, by an analytics system, a first segment definition and a second segment definition, each associated with an account identifier identifying a tracking account for a network property and that is maintained by the analytics system, wherein: the first segment definition defines a first segment of visitors to a network property and, for each visitor in the first segment, includes a visitor identifier identifying a device used by a visitor to visit the network property and which is issued by the analytics system, and the second segment definition defines a second segment of visitors to a network property, the second segment of visitors different from the first segment, and, for each visitor in the second segment, includes a visitor identifier identifying a device used by a visitor and which is issued by the analytics system; determining, by the analytics system, whether the first segment and second segment definitions present a personal information exposure risk for one or more of the visitors; only in response to determining that the segment definitions do not present a personal information exposure risk for one or more of the visitors: accessing, by the analytics system, tracking data communications for the network property associated with the account identifier, each tracking data communication including a visitor identifier and one or more event statistics describing one or more events related to a visitor interaction of a visitor with the network property, determining, by the analytics system, one or more segment signals from the tracking data communications that include the visitor identifiers of the first and second segments, each of the or more segment signals positively correlated with only one of the first segment or the second segment, and generating, by the analytics system, reporting data describing the segment signals and the correlation of the segment signals with the respective first and second segments. Other embodiments of this aspect include corresponding systems, apparatus, and computer program products.

Another aspect of the subject matter described in this specification can be embodied in methods that include the actions of receiving at a computer device associated with an entity that manages a network property, wherein the network property is associated with an account identifier for a tracking account maintained by an analytics system, an application program interface configured to enable an application program executing on the computer device to interface with the analytics system, the application program operable to process one or more segment queries based on the customer identifier issued by the entity and, for each segment query, identify customer identifiers belonging to the segment; processing, at the computer device, a segment query to select customer identifiers that belong to a first segment defined by the segment query; identifying, by the application program interface, visitor identifiers that correspond to the customer identifiers, wherein each visitor identifier identifies a computer device used by a visitor to visit the network property and is issued by the analytics system and is included in tracking data communications from the computer devices that visit the network property, and wherein each tracking data communication including the visitor identifier and one or more event statistics describing one or more events related to a visitor interaction of a visitor with the network property; providing, by the application program interface, a segment definition that defines the segment of visitors to a network property and for each visitor in the first segment includes the visitor identifier identifying the computer device used by a visitor to visit the network property and does not include the customer identifiers of the visitors; and receiving, in response to the segment definition, reporting data describing a segment signal that is positively correlated with the first segment, the segment signal derived by the analytics system from the tracking data communications that include the visitor identifiers of the first segment. Other embodiments of this aspect include corresponding systems, apparatus, and computer program products.

Particular embodiments of the subject matter described in this specification can be implemented to realize one or more of the following advantages. By processing tracking data of visitors tracked in a web analytics system grouped into two or more segments, wherein the publisher defines the segments, the analytics system determines what signals are positively or negatively correlated only one of the groups. By identifying signals that are correlated to only one of the groups, behavioral aspects that are indicative of each of the groups can be identified. The analysis is performed without requiring, utilizing, or exposing any personally identifiable information to the analytics system, and without exposing personal traffic history of any particular customer to the publisher. By identifying the signals without the risk of exposing identifiable information of individual users, the analytics system provides a framework to change advertising triggers, placements, and advertising messages of publishers to increase the response rate of the desired audience regarded as having a desirable customer profile while protecting the privacy concerns of individual users.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION 1.0 Overview

Figure 1:
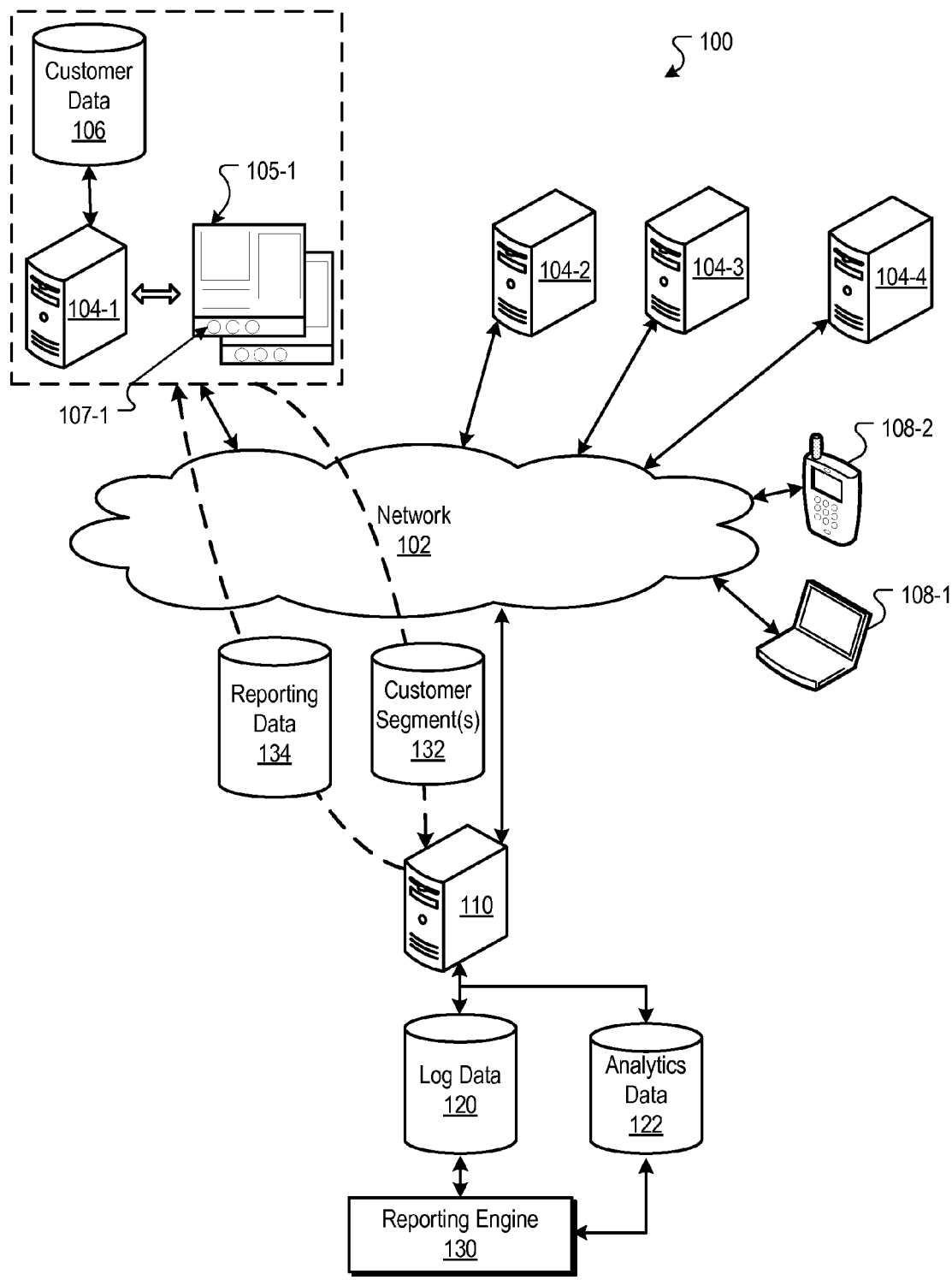
FIG. 1 is a block diagram of an example environment in which tracking data communications are reported and processed for customer segment analysis.

FIG. 1 is a block diagram of an example environment 100 in which tracking data communications are reported and processed for customer segment analysis. A computer network 102, such the Internet, or a combination of Internet and one or more wired and wireless networks, connects web sites 104-1-104-4, user devices 108-1 and 108-2, and an analytics system 110, such as data processing apparatus that includes a server or many networked servers. Although only four web sites and two user devices are shown, the online environment 100 includes many thousands of web sites and user devices.

A web site 104 is a one or more web page resource 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. For the purposes herein, the term "web page resource", or simply "web page", will be used to describe resources that are accessed through a web browser or similar type of application for display on a user device. Web pages can include HTML or XHTML data, multimedia data, e.g., flash video; images; audio; scripts; and other information and objects that can be presented and executed and/or interpreted in a browser. Web pages also can provide navigation to other web pages via hypertext links. The web pages are stored and retrieved from web servers that host the web page, and are typically requested and served from the web server using Hypertext Transfer Protocol (HTTP).

A user device, such as one of the devices 108-1 or 108-2, is an electronic device that is under control of a user and is capable of requesting and receiving resources over the network 102. Example user devices 108 include personal computers, e.g., user device 108-1, mobile communication devices, e.g., 108-2, and other devices that can send and receive data over the network 102. A user device 108 typically includes a user application, such as a web browser, to facilitate the sending and receiving of data over the network 102.

The publisher of the web site 104-1 has a tracking account with which data regarding traffic directed to and from the web site 104-1 and events related to actions taken by visitors to the web site 104-1 are associated in the analytics system 110. Each of the web pages 105-1 of the web site 104-1 that the publisher desires to track detailed statistics for visitor traffic has embedded within it the tracking request code described above. When one of the web pages 105-1 is rendered in a browser application on a user device 108, the tracking request code is executed and the browser cache is checked to determine if tracking code is stored in the cache. If tracking code is stored in the cache, then the tracking code is executed. Conversely, if the tracking code is not stored in the cache, then the tracking request code requests the tracking code from the analytics system 110. Upon receiving the tracking code from the analytics system 110, the user device 108 stores tracking code in the browser cache and executes the tracking code. In some implementations, the tracking request code can be configured to request the tracking code from the analytics system 110 each time a web page is loaded.

Execution of the tracking request code enables the user device 108 to provide tracking data communications to the analytics system 110. Example tracking data communication includes an account identifier identifying a tracking account, a visitor identifier identifying a visitor to the web page, an event time, and one or more event statistics. The account identifier is the tracking account number of the web site or web page.

The account identifier identifies an account for the particular network property of the publisher. The visitor identifier, in some implementations, is a cookie that is set by the tracking code and includes information that identifies the user device 108. For example, tracking code can generate a unique random number that is associated with the user device 108 and which as a limited lifetime, e.g., one month, at which time a new random number is generated. Thus, tracking data for a particular user device are not otherwise associated with or identify a particular user.

The event time, in some implementations, is a timestamp indicating the time at which the tracking data communication was sent to the analytics system 110. For example, a tracking data communication can be sent each time there is a page request generated by the user device 108. Accordingly, the event time will be the time at which the page request was generated at the user device 108.

Many different event statistics can be reported. For example, a web page can include data specifying which events are to be reported in tracking data communications. Typically the event statistics that are reported include referrer data identifying the referrer site, campaign data identifying the advertising campaign the visitor came from, the first times the visitor visited the web site, and the number of time the visitor has visited the web site. These events, as reported, are stored as log data 120 in a data store at the analytics system.

Because HTTP is a stateless protocol, historical data related for the visitor is stored in a tracking cookie for the web site 104. For example, when one of the web page 105-1 is loaded on the user device 108-1, one or more tracking cookies 107-1 for the web site 104-1 are stored in the browser cache on the user device 108-1. The tracking code then stores historical data for that visitor for the web site 104 in the one or more tracking cookies 107-1 on the user device 108-1. Accordingly, the state of the events, such as the number of visits and the first time the user device 108-1 visited the web site 104-1, can be accurately reported to the analytics system 110.

The analytics system 110 includes a reporting engine 130 that processes the log data 120 to generate analytics data 122. The analytics data 122 are data describing various metrics and statistics, such as data used to measure the success of a publisher's online advertising campaigns, to compare a publisher's website usage metrics with industry averages, and to visualize trends, patterns, and key comparisons with various visualization formats. The analytics system 110 provides reporting data 134 to the publisher that presents the various traffic and behavioral-related attributes of visitors to the publisher's website as detailed in the analytics data. Typically such reports are aggregated at a website level and are not segmented by demographics, as the analytics system 110 may not, in some implementations, collect personally identifiable information of visitors.

The publisher, on the other hand, often collects personally identifiable information of users that visit its website. This is done to better service users, e.g., to allow users to track their personal accounts maintained by the publisher, to review purchase histories, and the like. Example personally identifiable information includes a person's name, and age, an address, gender, and other information for a user account that the user establishes with the publisher. Typically, the publisher stores this data into customer data store 106, and, optionally, stores some of the information in corresponding cookies on user devices 108.

In some implementations, the analytics system 110 facilitates the processing of analytics data for customer segment definitions 132 that are defined and provided by the publisher 104. The segment definitions include the visitor identifiers that are issued by the analytics system, and do not include the customer identifiers that are issued by the publisher. To create the segment definitions, the publisher has access to the visitor identifiers that are issued by the analytics system 110. In some implementations, the publisher can store its own traffic logs that record traffic events for user devices. Because the HTTP requests from the user devices will include the visitor identifier issued by the analytics system 110, and because the customer data 106 stores individual user data, the publisher 104 may define its own customer segments and derive the corresponding visitor identifiers from the traffic logs. In some implementations, the analytics system 110 provides an analytics application programming interface (API) through which one or more programs may provide segment definitions to the analytics system for processing. Typically the segments are different, but the segments need not be mutually exclusive. In other words, there is at least one visitor identifier in one segment that is not included in another segment.

The analytics system 110 processes reported tracking data communications for the publisher stored in the log data 120. For each of the segments, the analytics system 110 determines segment signals from the tracking data communications. Each segment signal is positively correlated with only one of the segments 132. The results of the analysis are then provided in the form of reports in the reporting date 134 that describe the segment signals and the correlation of the segment signals with the respective segment definitions 132.

The analytics system 110 also determines whether the first and second segment definitions present personal information exposure risk for one or more users. For example, a segment definition with only one customer identifier would present a personal information exposure risk, as the reporting data would relate to only a particular customer. Likewise, two segment definitions that differ by only one visitor identifier would also present personal information exposure risk. If the analytics system 110 determines that the first and/or second segment definitions present personal information exposure risk, and the reports are not processed and reporting data are not provided to the publisher.

The generation and processing of segment definitions and the determination of whether the first and second segment definitions present a personal information exposure risk are described in more detail with reference to FIG. 2 below.

2.0 Segment Definition Processing

Figure 2:
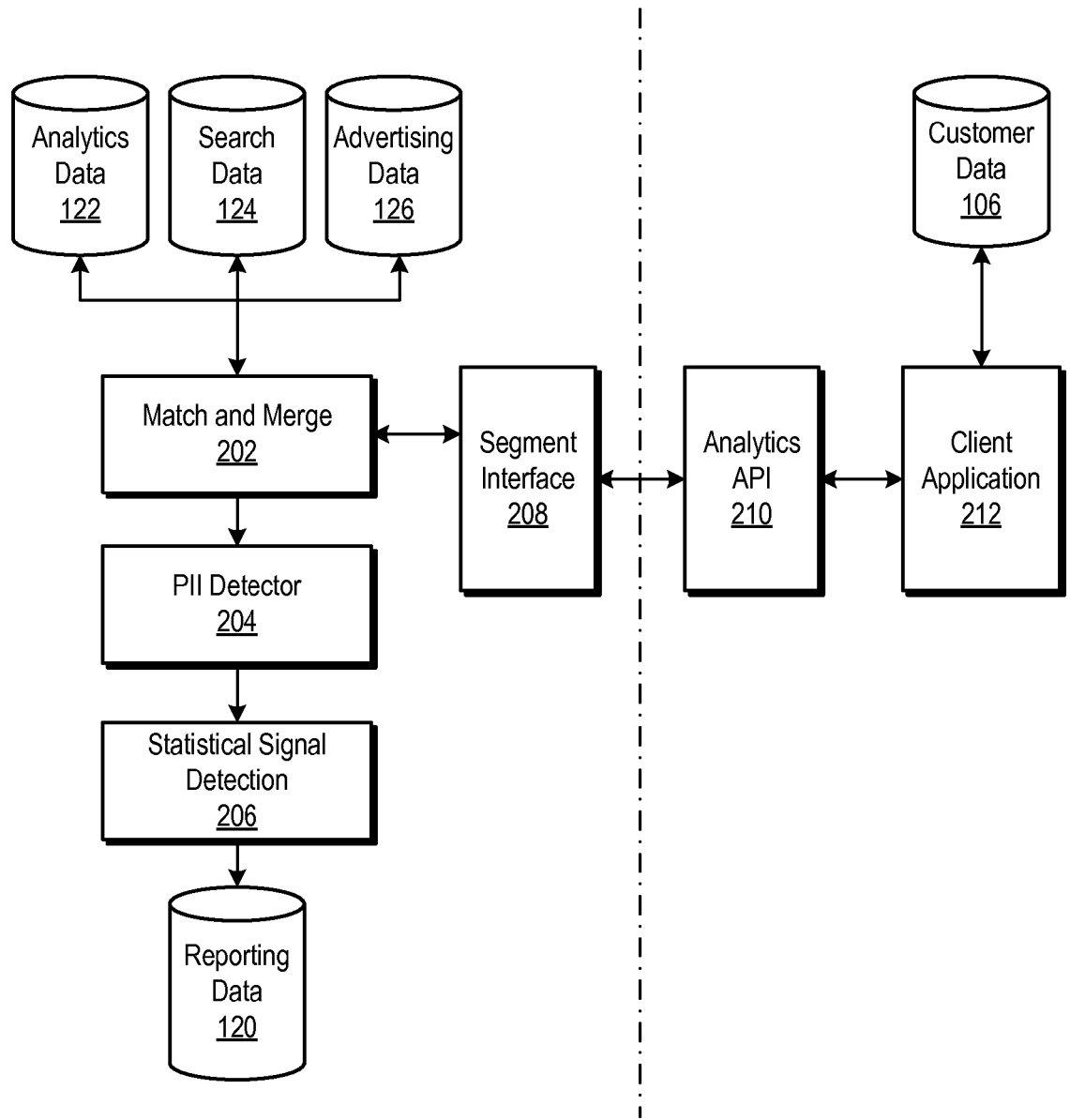
FIG. 2 is a block diagram of an example system for processing tracking data for customer segments.

FIG. 2 is a block diagram of an example system 200 for processing tracking data for customer segments. As described above, an analytics system 110 issues visitor identifiers that are used in conjunction with account identifiers to report events to the analytics system 110.

The analytics system 110 provides the publisher with an analytics API 210. The API 210 is configured to enable a client application program 212 executing on a computer device to interface with the analytics system. An example application program is a customer relation management (CRM) program, and which is capable of processing one or more segment queries based on the customer identifier issued by the publisher. For each segment query, the application program 212 identifies customer identifiers belonging to a segment. For example, the publisher may define two segment queries, a first for customers that have purchased at least one product per month from the publisher, and the second segment query for customers that have not purchased any products from the publisher. Other segment queries with additional parameters can also be processed by the client application 212.

The client device processes the segment queries to select customer identifiers that belong to the segment defined by the segment queries. The API 210 is used to identify visitor identifiers issued by the analytics system 110 that correspond to the customer identifiers without exposing the customer identifiers to the analytics system 110. For example, the API 210 may access locally stored web traffic data at the publisher for particular customers, and from the customer identifier determine the corresponding visitor identifiers. The visitor identifiers are used to generate segment definition, each of which are associated with an account identifier of the publisher that identifies the tracking account for a network property of the publisher. Each segment definition defines a segment of visitors to the publisher network property and, optionally, an aggregate segment characteristic of the first segment. The visitor identifier associated with each visitor that belongs to the segment is also included in the segment definition.

The API 210 is used to provide the segment definitions to the analytics system 110, e.g., by use of a segment interface 208. The segment interface 208 can, for example, be a separate user interface or can be session over a particular port. The segment definitions do not include the customer identifiers or other information that personally identifies particular customers.

In response to receiving the segment definitions, the analytics system 110 accesses analytics data 122 to gather tracking events specified in tracking data communications that include the visitor identifiers. In some implementations, other data may also be accessed, such as search data 124 and advertising data 126, provided the visitor identifiers can be used to identify corresponding search data 124 and advertising data 126 of a visitor. Example search data 124 include search queries issued by a device associated with the visitor identifier, and search results that are selected at the user device. Example advertising data 126 includes advertisements that were displayed at the user device ("impressions"), and selections of the advertisements that occurred at the user device. The use of search data and advertising data is optional.

A matching and merger module 202 is used to select the analytics data 122, the search data 124, and advertising data 126 that corresponds to the visitor identifiers in each of the segment definitions. After the data are gathered, the analytics system 110 determines, by use of a PII detector module 204, whether any of the segment definitions present a personal information exposure risk for one or more of the visitors. The determination can be made, for example, on the segment definitions, on the data provided for the segment definitions, or a combination of both. Examples of how this determination is made are described with reference to FIG. 3 below.

If the segment definitions present a personal information exposure risk, then the segment definitions are not processed. In this case, the analytics system 110 informs the publisher the segment definitions cannot be processed and that the publisher needs to redefine the segments before the segments can be processed. In some implementations, the analytics system 110 can inform the publisher how the segment should be redefined to allow for processing of the segments. For example, if the analytics system 110 determines that the personal information exposure risk is due to the segments being too small, then the analytics system 110 may provide a suggestion that the publisher increase the size of each segment by a certain percentage, or remove limiting criteria so that the segment sizes are increased. This information may be presented in the client application 212 by use of the API 210.

In some implementations, the analytics system 110 processes segment definitions only in response to determining that the segment definitions do not present a personal information exposure risk will. The analytics system 110 utilizes a statistical signal detection module 206 to process the segment definitions. The detection module 206 accesses the tracking data gathered from the analytics data 122, and optionally the search data 124 and advertising data 126, and determines one or more segment signals from these data. Each of the segment signals are positively correlated with only one of the first segment or the second segment to identify signals that are indicative of a respective segment.

For example, assume the publisher is a mortgage lender and implements an advertising campaign that places advertisements with search results, and places advertisements in financially related websites. The analytics system identifies which visitors arrive at the publisher's website from selections of the advertisements. The publisher is interested in knowing which percentage of users that arrive actually apply for mortgages, and of the groups of users that apply for mortgages and that do not apply for mortgages, what signals are indicative of each group. The publisher runs a query in its internal CRM application 212 to identify customer identifiers that belong to one of the two segments. The analytics API 210 is invoked to provide the segment definitions, as defined by the visitor identifiers issued by the analytics system 110, to the analytics system 110. Provided the PII detector module 204 determines that the segment definitions do not present a personal information exposure risk, the statistical signal detection module 206 identifies keywords, searches, ad exposures and clicks that are positively correlated against the first segment but not the second segment, and vice versa. The signal detection module 206 can identify the keywords, searches, ad exposures and clicks that are positively correlated against the first segment but not the second segment, and vice versa, by using any of a variety of regression techniques, statistical analysis techniques, data mining techniques, and the like. The results are then presented in the form of a report to the publisher.

For example, assume the keyword "cheap rates" and the "low credit scores" positively correlate to the group of users that do not apply for mortgages, while the keywords "fixed rate jumbo loans" positively correlates to the group of users apply for mortgages. The analytics system 110 generates reporting data 120 that provides a report to the publisher detailing this information. In turn, the publisher may adjust its advertising campaign to take into account the findings of the report. For example, the publisher may remove the keywords "cheap rates" and "low credit scores" from its advertising campaign, and may increase its budget on the keyword "fixed rate jumbo loans."

Keywords are just an example signal. Other signals can also emerge. Examples of other signals include a referring network property of another publisher from which a visitor navigated to the network property of the publisher; a frequency of visits to the network property of the publisher by the devices identified by the visitor identifiers; or even the agent browser type of a browser used on the user device when navigating to the publisher property. In general, any statistical signal that can emerge from the data that is only positively correlated with one segment can be used as a segment signal.

3.0 Example Analytics System Processing

Figure 3:
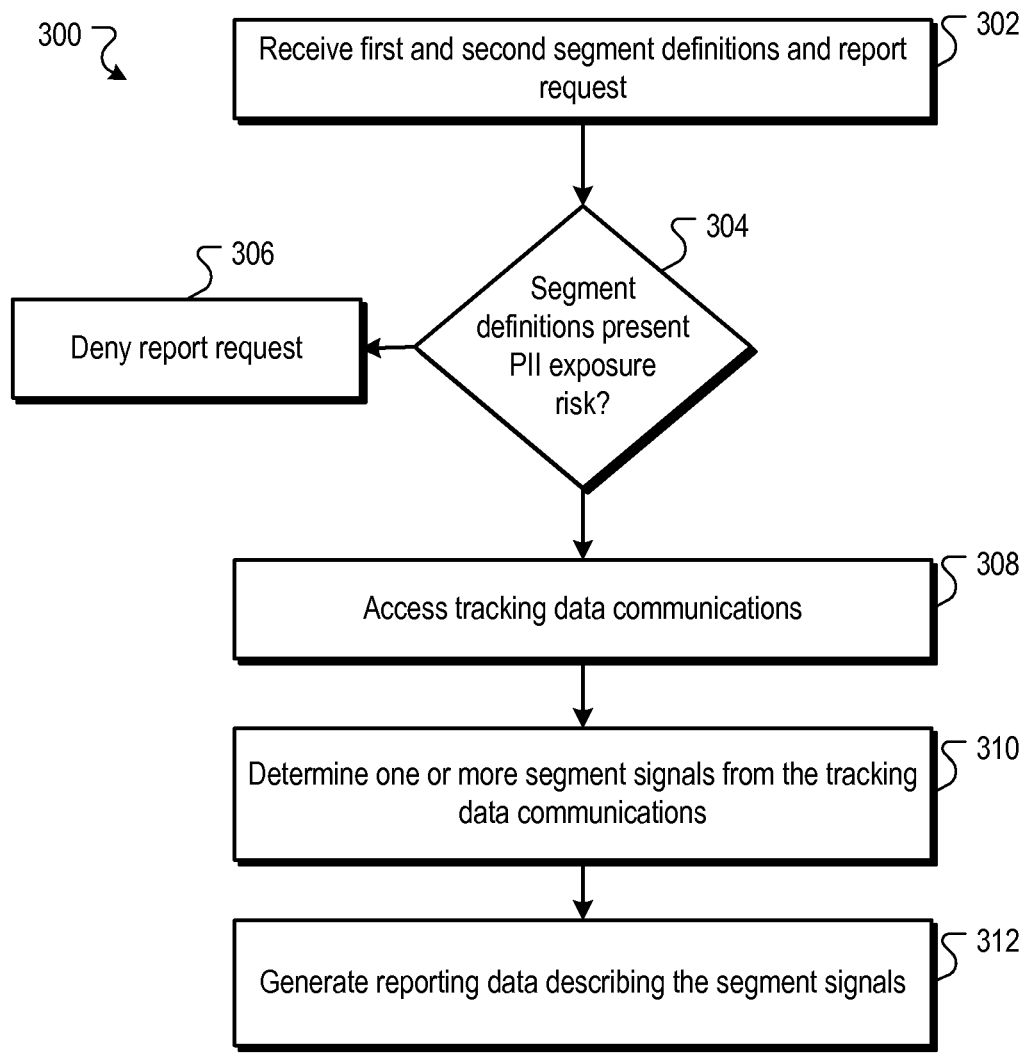
FIG. 3 is a flow diagram of an example process for processing customer segments to generate segment reports.

FIG. 3 is a flow diagram of an example process 300 for processing customer segments to generate segment reports. The process 300 can, for example, implemented in the analytics system 110 of FIG. 1.

The analytics system 110 receives first and second segment definitions and a report request (302). For example, the analytics system 110 can receive a first segment definition and a second segment definition, each associated with an account identifier identifying a tracking account for a network property and that is maintained by the analytics system. The first segment definition defines a first segment of visitors to a network property and, for each visitor in the first segment, includes a visitor identifier associated with the visitor (e.g., which identifies a user device used by the visitor) and which is issued by the analytics system 110. Likewise, the second segment definition defines a second segment of visitors to a network property and, for each visitor in the second segment, includes a visitor identifier associated with the visitor and which is issued by the analytics system 110.

The analytics system 110 determines if the segment definitions present a PII exposure risk (304). There are a variety a ways the analytics system 110 can determine if the definitions present an exposure risk. For example, the analytics system 110 may determine that the first and second segment definitions present a personal information exposure risk when a quantity of visitor identifiers included in the first segment is not at least a minimum quantity or a quantity of visitor identifiers included in the second segment is not at least the minimum quantity. The minimum quantity can be selected to ensure that aggregate statistics for the segment can not be used to identifier traffic patters of individual customers. For example, the minimum segment size could be 50 for each segment. Other values can also be used.

In another example, the analytics system 110 may determine that the first and second segment definitions present a personal information exposure risk when a quantity of visitor identifiers included in the first segment that are different from the visitor identifiers included in the second segment is not at least a minimum quantity. For example, if two segments overlap for all but one visitor identifier, then the traffic patterns for the corresponding customer that corresponds to the visitor identifier may be derived. In some implementations, the analytics system 110 may require that the minimum number of different visitor identifiers be at least 50. Other values can also be used.

In another example, the analytics system 110 may determine that the first and second segment definitions present a personal information exposure risk when a quantity of visitor identifiers included in the first segment and second segments that are different from visitor identifiers included in previously received first and second segments is not at least a minimum quantity. For example, for each publisher, the analytics system 110 stores previously received segment definitions for requested reports. If the difference in the visitor identifiers are less than a minimum quantity, e.g., 50, then the segment definitions are determined to present a personal information exposure risk, as the differences in the reporting data 124 provided may be used to derive traffic patters for certain visitor identifiers, and thus for certain customers.

Other ways of determining whether the first and second segment definitions present a personal information exposure risk can also be implemented. Furthermore, combinations of the above processing techniques can also be used.

If the analytics system 110 determines that the segment definitions present a PII exposure risk, then the analytics system 110 denies the report request (306). Conversely, if the analytics system 110 determines that the segment definitions do not present a PII exposure risk, and the analytics system 110 accesses tracking data communications (308). The tracking data communications are for the network property of the publisher associated with the account identifier. Each tracking data communication including a visitor identifier identifying a device used by a visitor to visit the network property and one or more event statistics describing one or more events related to a visitor interaction of a visitor with the network property. Other data can also be accessed, such as search data and advertising data.

The analytics system 110 determines one or more segment signals from the tracking data communications (310). Each of the one or more segment signals is positively correlated with only one of the first segment or the second segment.

The analytics system 110 generates reporting data describing the segment signals (312). The reporting data describe the segment signals and the correlation of the segment signals with the respective first and second segments, and are used to display reports at client devices.

4.0 Example Publisher System Processing

Figure 4:
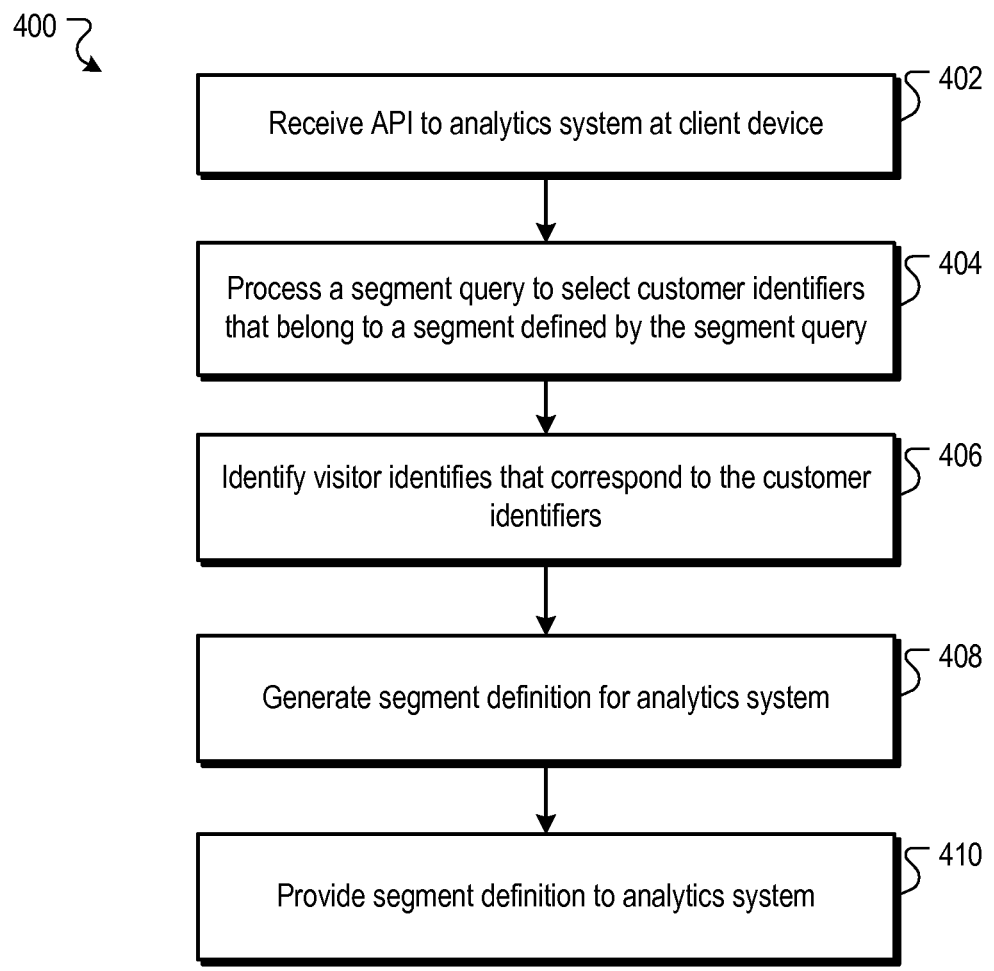
FIG. 4 is a flow diagram of an example process for generating segment definitions for analysis by an analytics system.

FIG. 4 is a flow diagram of an example process 400 for generating segment definitions for analysis by an analytics system. The process 400 can, for example, implemented in a client device of a publisher.

The client device receives an API to the analytics system 110 (402). The API is configured to enable an application program executing on the computer device to interface with the analytics system. An example application program is one that is operable to process one or more segment queries based on the customer identifier issued by the entity and, for each segment query, identify customer identifiers belonging to a segment.

The client device processes a segment query to select customer identifiers that belong to a segment defined by the segment query (404). The segment query is input, for example, by an employee of the publisher, such as a customer relationship management specialist.

The client device identifies visitor identifiers that correspond to the customer identifiers (406). Each visitor identifier is issued by the analytics system and is included in tracking data communications from computer devices that visit the network property. The visitor identifiers thus differ from customer identifiers that are issued by the publisher.

The client device generates segment definitions for the analytics system 110 (408). The segment definitions are as described above, i.e., each is a definition that defines the segment of visitors to a network property and for each visitor in the segment includes the visitor identifier associated with the visitor and does not include the customer identifiers of the visitors.

The client device provides segment definition to the analytics system 110 (410). The definition is processed and, provided the definition does not present a personal identification exposure risk, reporting data describing a segment signal that is positively correlated with the segment is received from the analytics system.

5.0 Example Computer System

Figure 5:
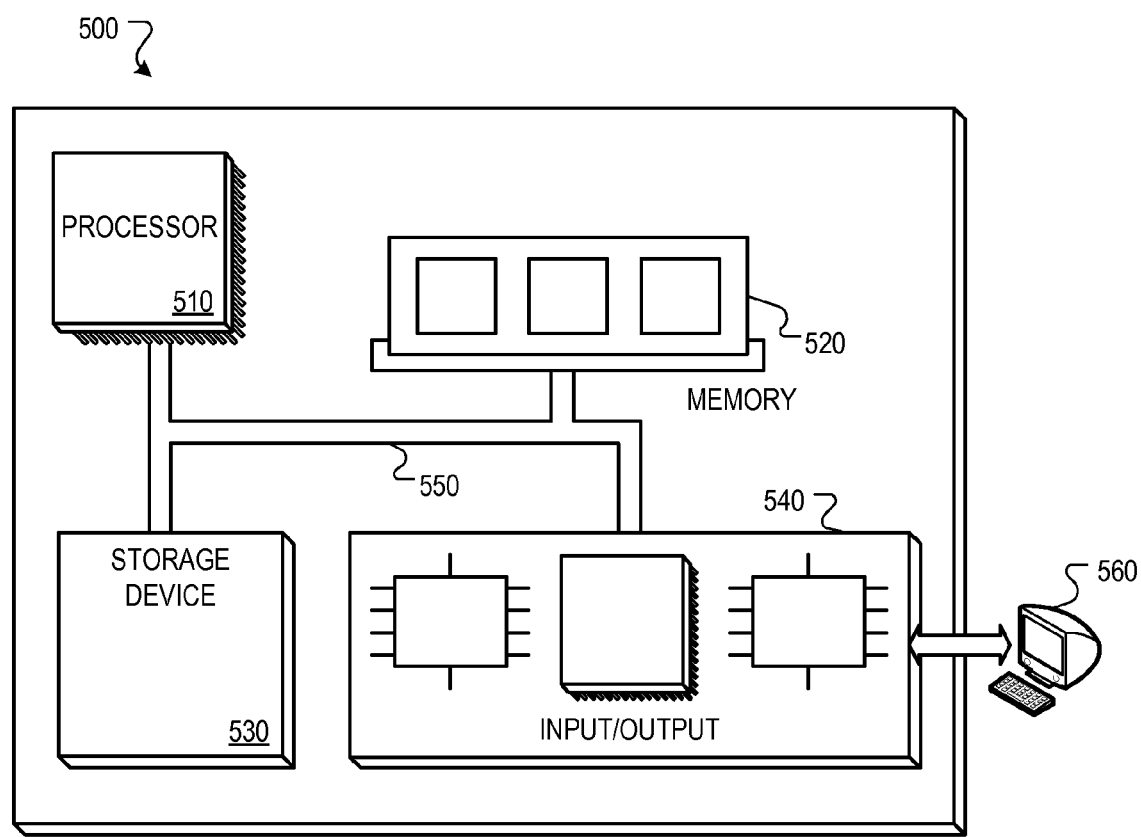
FIG. 5 is a block diagram of an example computer system that can be utilized to implement the systems and methods described herein.

FIG. 5 is a block diagram of an example computer system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or one that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by an analytics system and from a publisher, a first segment definition and a second segment definition, each associated with an account identifier identifying a tracking account for a network property of the publisher, and the tracking account being maintained by the analytics system, wherein:
     the first segment definition defines a first segment of visitors to the network property, each visitor in the first segment being a visitor that exhibited a first behavior at the network property of the publisher, and, for each visitor in the first segment, includes a visitor identifier identifying a device used by the visitor to visit the network property, the visitor identifier being issued by the analytics system; and
     the second segment definition defines a second segment of visitors to the network property, each visitor in the second segment being a visitor that exhibited a second behavior at the network property of the publisher, the second behavior being different form the first behavior, the second segment of visitors being different from the first segment of visitors, and wherein the second segment definition includes, for each visitor in the second segment, a visitor identifier identifying a device used by the visitor to visit the network property, the visitor identifier being issued by the analytics system;
   determining, by the analytics system, whether the first segment and second segment definitions present a personal information exposure risk for one or more of the visitors;
   only in response to determining that the segment definitions do not present a personal information exposure risk for one or more of the visitors:
     accessing, by the analytics system, tracking data communications for the network property associated with the account identifier, each tracking data communication including a visitor identifier and one or more event statistics describing one or more events related to a visitor interaction of a visitor with the network property;
     determining, by the analytics system, one or more segment signals from the tracking data communications that include the visitor identifiers of the first and second segments, each of the one or more segment signals positively correlated with only one of the first segment or the second segment and characterizing a respective behavior indicative of the segment with which it positively correlates, and wherein each respective behavior is different from the first behavior and the second behavior; and
     generating, by the analytics system, reporting data describing the segment signals and the correlation of the segment signals with the respective first and second segments.

2. The computer-implemented method of claim 1, wherein determining whether the first segment and second segment definitions present a personal information exposure risk for one or more of the visitors comprises:
   determining that the first and second segment definitions present a personal information exposure risk when a quantity of visitor identifiers included in the first segment is not at least a minimum quantity or a quantity of visitor identifiers included in the second segment is not at least the minimum quantity.

3. The computer-implemented method of claim 1, wherein determining whether the first segment and second segment definitions present a personal information exposure risk for one or more of the visitors comprises:
   determining that the first and second segment definitions present a personal information exposure risk when a quantity of visitor identifiers included in the first segment that are different from the visitor identifiers included in the second segment is not at least a minimum quantity.

4. The computer-implemented method of claim 1, wherein determining whether the first segment and second segment definitions present a personal information exposure risk for one or more of the visitors comprises:
   determining that the first and second segment definitions present a personal information exposure risk when a quantity of visitor identifiers included in the first segment and segments that are different from visitor identifiers included in previously received first and second segments is not at least a minimum quantity.

5. The computer-implemented method of claim 1, wherein the visitor identifiers of at least one of the segment definitions have corresponding customer identifiers issued by an entity that manages the network property, each customer identifier identifying a visitor, and wherein the segment definitions do not include the customer identifiers.

6. The computer-implemented method of claim 5, further comprising:
providing to a computer device associated with the entity an application program interface configured to enable an application program executing on the computer device to interface with the analytics system, the application program operable to process one or more segment queries based on the customer identifiers and, for each segment query, identify customer identifiers belonging to a segment, and wherein the application program interface identifies the visitor identifiers from the customer identifiers and provides only the visitor identifiers to the analytics system.

7. The computer-implemented method of claim 1, wherein a segment signal includes a keyword used in advertising targeting for an entity that manages the network property.

8. The computer-implemented method of claim 1, wherein a segment signal includes an identification of a referring network property from which a visitor navigated to the network property.

9. The computer-implemented method of claim 1, wherein a segment signal includes a frequency of visits to the network property by the devices identified by the visitor identifiers.

10. The computer-implemented method of claim 1, wherein determining, by the analytics system, one or more segment signals from the tracking data communications that include the visitor identifiers of the first and second segments comprises determining the one or more segment signals from only tracking data communications that each include a visitor identifier from the first segment and tracking data communications that each include a visitor identifier from the second segment.

11. A computer-implemented method, comprising:
receiving at a computer device associated with an entity that manages a network property, wherein the network property is associated with an account identifier for a tracking account maintained by an analytics system, an application program interface configured to enable an application program executing on the computer device to interface with the analytics system, the application program operable to process one or more segment queries based on the customer identifier issued by the entity and, for each segment query, identify customer identifiers belonging to the segment;
processing, at the computer device, a first segment query to select customer identifiers that belong to a first segment defined by the first segment query, each customer identifier in the first segment specifying a visitor that exhibited a first behavior at the network property of the entity;
processing, at the computer device, a second segment query to select customer identifiers that belong to a second segment defined by the second segment query, wherein each customer identifier that belongs to the second segment is different from each customer identifier that belongs to the first segment, each customer identifier in the second segment specifying a visitor that exhibited a second behavior at the network property of the entity, the second behavior being different from the first behavior;
identifying, by the application program interface, visitor identifiers that correspond to the customer identifiers, wherein each visitor identifier i) identifies a computer device used by a visitor to visit the network property ii) is issued by the analytics system, and iii) is included in tracking data communications from the computer devices that visit the network property, and wherein each tracking data communication includes one or more event statistics describing one or more events related to a visitor interaction of a visitor with the network property;
providing, by the application program interface and to the analytics system, a first segment definition that defines the first segment of visitors to the network property and a second segment definition that defines the second segment of visitors to the network property, wherein each segment definition includes the visitor identifiers identifying the computer devices used by visitors to visit the network property and does not include the customer identifiers of the visitors; and
receiving, in response to providing the segment definitions, reporting data describing a segment signal that is positively correlated with the first segment, the segment signal derived by the analytics system from the tracking data communications that include the visitor identifiers of the first segment and characterizing a respective behavior indicative of the first segment with which it positively correlates, and wherein the respective behavior is different from the first behavior and the second behavior.

12. The computer-implemented method of claim 11, wherein the segment signal is a keyword used in advertising targeting for the entity that manages the network property.

13. The computer-implemented method of claim 11, wherein the segment signal is an identification of a referring network property from which a visitor navigated to the network property.

14. The computer-implemented method of claim 11, wherein the segment signal is a frequency of visits to the network property by the devices identified by the visitor identifiers.

15. An analytics system, comprising:
a data processing apparatus; and
a memory storage device storing instructions executable by the data processing apparatus and that upon such execution cause the data processing apparatus to perform operations comprising:
receiving, from a publisher, a first segment definition and a second segment definition, each associated with an account identifier identifying a tracking account for a network property of the publisher, and the tracking account being maintained by the analytics system, wherein:
the first segment definition defines a first segment of visitors to the network property, each visitor in the first segment being a visitor that exhibited a first behavior at the network property of the publisher and, for each visitor in the first segment, includes a visitor identifier identifying a device used by the visitor to visit the network property, the visitor identifier being issued by the analytics system; and
the second segment definition defines a second segment of visitors to the network property, each visitor in the second segment being a visitor that exhibited a second behavior at the network property of the publisher, the second behavior being different form the first behavior, the second segment of visitors being different from the first segment of visitors, and wherein the second segment definition includes, for each visitor in the second segment, a visitor identifier identifying a device used by the visitor to visit the network property, the visitor identifier being issued by the analytics system;

determining whether the first segment and second segment definitions present a personal information exposure risk for one or more of the visitors;

only in response to determining that the segment definitions do not present a personal information exposure risk for one or more of the visitors:
- accessing tracking data communications for the network property associated with the account identifier, each tracking data communication including a visitor identifier and one or more event statistics describing one or more events related to a visitor interaction of a visitor with the network property;
- determining one or more segment signals from the tracking data communications that include the visitor identifiers of the first and second segments, each of the one or more segment signals positively correlated with only one of the first segment or the second segment and characterizing a respective behavior indicative of the segment with which it positively correlates, and wherein each respective behavior is different from the first behavior and the second behavior; and
- generating reporting data describing the segment signals and the correlation of the segment signals with the respective first and second segments.

16. The analytics system of claim 15, wherein determining whether the first segment and second segment definitions present a personal information exposure risk for one or more of the visitors comprises:
determining that the first and second segment definitions present a personal information exposure risk when a quantity of visitor identifiers included in the first segment is not at least a minimum quantity or a quantity of visitor identifiers included in the second segment is not at least the minimum quantity.

17. The analytics system of claim 15, wherein determining whether the first segment and second segment definitions present a personal information exposure risk for one or more of the visitors comprises:
determining that the first and second segment definitions present a personal information exposure risk when a quantity of visitor identifiers included in the first segment that are different from the visitor identifiers included in the second segment is not at least a minimum quantity.

18. The analytics system of claim 15, wherein determining whether the first segment and second segment definitions present a personal information exposure risk for one or more of the visitors comprises:
determining that the first and second segment definitions present a personal information exposure risk when a quantity of visitor identifiers included in the first segment and segments that are different from visitor identifiers included in previously received first and second segments is not at least a minimum quantity.

19. The analytics system of claim 15, wherein the visitor identifiers of at least one of the segment definitions have corresponding customer identifiers issued by an entity that manages the network property, each customer identifier identifying a visitor, and wherein the segment definitions do not include the customer identifiers.

20. The analytics system of claim 15, further comprising:
providing to a computer device associated with the entity an application program interface configured to enable an application program executing on the computer device to interface with the analytics system, the application program operable to process one or more segment queries based on the customer identifiers and, for each segment query, identify customer identifiers belonging to a segment, and wherein the application program interface identifies the visitor identifiers from the customer identifiers and provides only the visitor identifiers to the system.

21. The analytics system of claim 15, wherein determining one or more segment signals from the tracking data communications that include the visitor identifiers of the first and second segments comprises determining the one or more segment signals from only tracking data communications that each include a visitor identifier from the first segment and tracking data communications that each include a visitor identifier from the second segment.

22. A computer readable storage device comprising instructions that, when executed by a data processing apparatus, cause the data processing apparatus to perform operations comprising:
receiving, from a publisher, a first segment definition and a second segment definition, each associated with an account identifier identifying a tracking account for a network property of the publisher, and the tracking account being maintained by the analytics system, wherein:
- the first segment definition defines a first segment of visitors to the network property and, each visitor in the first segment being a visitor that exhibited a first behavior at the network property of the publisher, for each visitor in the first segment, includes a visitor identifier identifying a device used by the visitor to visit the network property, the visitor identifier being issued by the analytics system; and
- the second segment definition defines a second segment of visitors to the network property, each visitor in the second segment being a visitor that exhibited a second behavior at the network property of the publisher, the second behavior being different form the first behavior, the second segment of visitors being different from the first segment of visitors, and wherein the second segment definition includes, for each visitor in the second segment, a visitor identifier identifying a device used by the visitor to visit the network property, the visitor identifier being issued by the analytics system;

determining whether the first segment and second segment definitions present a personal information exposure risk for one or more of the visitors;

only in response to determining that the segment definitions do not present a personal information exposure risk for one or more of the visitors:
- accessing tracking data communications for the network property associated with the account identifier, each tracking data communication including a visitor identifier and one or more event statistics describing one or more events related to a visitor interaction of a visitor with the network property;
- determining one or more segment signals from the tracking data communications that include the visitor identifiers of the first and second segments, each of the one or more segment signals positively correlated with only one of the first segment or the second segment and characterizing a respective behavior indicative of the segment with which it positively correlates, and wherein each respective behavior is different from the first behavior and the second behavior; and generating reporting data describing the segment signals and the correlation of the segment signals with the respective first and second segments.

23. The computer readable storage device of claim 22, wherein determining one or more segment signals from the tracking data communications that include the visitor identifiers of the first and second segments comprises determining the one or more segment signals from only tracking data communications that each include a visitor identifier from the first segment and tracking data communications that each include a visitor identifier from the second segment.

\* \* \* \* \*